(12) United States Patent
Zhou et al.

(10) Patent No.: US 11,502,564 B2
(45) Date of Patent: Nov. 15, 2022

(54) MULTI-LAYER AXIAL AND RADIAL FLUX VERNIER PERMANENT MAGNET MOTOR

(71) Applicant: Mitsubishi Electric Research Laboratories, Inc., Cambridge, MA (US)

(72) Inventors: Lei Zhou, Cambridge, MA (US); Bingnan Wang, Cambridge, MA (US); Chungwei Lin, Cambridge, MA (US); Dehong Liu, Cambridge, MA (US); Yebin Wang, Cambridge, MA (US); Koon Hoo Teo, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 79 days.

(21) Appl. No.: 16/839,144

(22) Filed: Apr. 3, 2020

(65) Prior Publication Data

US 2021/0313851 A1    Oct. 7, 2021

(51) Int. Cl.
*H02K 11/33*    (2016.01)
*H02K 1/2786*    (2022.01)
*H02K 1/16*    (2006.01)
*H02K 7/00*    (2006.01)
*H02K 9/22*    (2006.01)

(52) U.S. Cl.
CPC ............ *H02K 1/2786* (2013.01); *H02K 1/16* (2013.01); *H02K 7/003* (2013.01); *H02K 9/22* (2013.01); *H02K 11/33* (2016.01)

(58) Field of Classification Search
CPC ........ H02K 1/2786; H02K 11/33; H02K 1/16; H02K 7/003; H02K 9/22

USPC ......................................................... 310/68 d
See application file for complete search history.

(56) References Cited

U.S. PATENT DOCUMENTS

| 6,204,589 | B1* | 3/2001 | Cascio ............... F16F 15/1215 |
| | | | 310/261.1 |
| 7,755,244 | B2* | 7/2010 | Ley ........................ H02K 1/148 |
| | | | 310/216.019 |
| 10,505,483 | B2 | 12/2019 | Zhou et al. |
| 2006/0262576 | A1* | 11/2006 | Przybyla ............... H02M 7/219 |
| | | | 363/21.02 |
| 2012/0212085 | A1* | 8/2012 | Fu .......................... H02K 21/24 |
| | | | 310/58 |
| 2014/0285048 | A1 | 9/2014 | Seo et al. |

(Continued)

*Primary Examiner* — Terrance L Kenerly
(74) *Attorney, Agent, or Firm* — Gennadiy Vinokur; Hironori Tsukamoto

(57) ABSTRACT

A motor comprising a shaft, an array of stator assemblies rigidly attached to the shaft, each stator assembly includes a stator yoke having a toroid shape fixed around the shaft and having a number of slots at radial and axis directional faces with windings within the slots of the stator yoke, and a rotor assembly rotatively attached to the shaft to enclose the array of stator assemblies, the rotor assembly has a rotor drum with sections, each section embraces one stator assembly, each section has two axial-flux permanent magnet arrays attached on axial-directional inner surfaces of the section and has one radial-flux permanent magnet array attached on a radial-directional inner surface of the section furthest from the shaft, wherein the axial-flux and the radial-flux permanent magnet arrays with the number of pole pairs equals the number of the stator slots plus or minus the number of stator winding pole pair.

9 Claims, 8 Drawing Sheets

(56) References Cited

U.S. PATENT DOCUMENTS

2014/0354091 A1* 12/2014 Yamada .................. H02K 9/19
310/54
2017/0012486 A1* 1/2017 Yamagishi ............. H02K 3/522
2017/0047792 A1 2/2017 Klassen et al.
2017/0274992 A1* 9/2017 Chretien ................ H02K 16/00

* cited by examiner

MULTI-LAYER AXIAL AND RADIAL FLUX VERNIER PERMANENT MAGNET MOTOR

TECHNICAL FIELD

This invention relates generally to a motor, and more specifically to a multi-layer axial and radial flux vernier permanent magnet motor.

BACKGROUND

Electric motors are one of the most significant energy conversion systems used in industry today. An electric motor is an electric machine that converts electric energy into mechanical energy. The vast majority of the electric motors operate through interaction between the motor's magnetic field and electric current in a winding to generate a force in the form of rotation of a shaft. Some of the electric motors require pairing with speed-reducing transmission mechanism (such as a gearbox) when driving loads for various applications. This is mainly due to two reasons: (a) electric machines are most efficient at its rated speed, which is usually higher than a speed required for driving the load, and (b) direct torque output of the electric machines are usually not high enough for the applications, and the transmission mechanism is needed to increase the torque. Such motor drive architecture including both the electric motor and the transmission mechanism are utilized in various application areas, such as machine tools, industrial machinery, home appliances, electric vehicles, etc.

However, the gearbox typically has nonlinear dynamics such as backlash hysteresis, nonlinear Coulomb friction, which can impair the electric motor's dynamic performance, and is not favorable for precision applications. To that end, in a number of other application areas, such as machine-room-less elevators, robot manipulators, precision rotary stages, and in-wheel drives for electric vehicles, it is highly beneficial to eliminate such transmission mechanism, and directly drive the load with the electric motor. Such direct-drive motors can effectively reduce volume of actuator assembly, which makes the electric motor or the motor drive architecture more compact. Also, gearbox fault is one of major failure mode for geared motors, and the use of the direct-drive motors is beneficial in view of reliability.

Compared with a regular electric motor for general drivers, the direct-drive motors need to have ultra-high torque density and relatively high efficiency with a compact form factor. However, it is difficult to increase the torque density. Many methods and motor configurations are developed to achieve high torque density. For example, an axial-flux permanent magnet motor design is utilized for achieving the high torque density targeting at direct-drive applications. Such design helps to reduce axial length of the motor without loss of torque capability. Further, in order to increase effective torque generation area over rotor's surface, multi-stage motors and combined axial and radial flux motors are employed. In some motor configurations, the electric motor's pole pair numbers are increased to increase the motor's torque capability. However, such methods and motor configurations violate mechanical stability, and also, do not consider thermal management of the electric motor.

Therefore, there is a need for the motor configuration providing high torque density while maintaining the mechanical stability, for the direct-drive applications.

SUMMARY

It is an object of some embodiments to provide a motor configuration that can deliver high torque density, aiming at direct-drive actuators in various application areas. It is also objective of some embodiments to provide the motor configuration that can achieve mechanical stability. Additionally, or alternatively, it is an objective of some embodiments to provide the motor configuration that can achieve compactness and thermal management of the motor.

To achieve one or combination of these objectives, some embodiments use one or combination of features such as multi-layer radial and axial-flux motor, out-runner motor configuration, toroidal windings for stator, Vernier permanent magnet motor principle, and Halbach magnet array. The aforementioned features are utilized for the configuration of the motor of present disclosure.

Some embodiments are based on recognition that use of the multi-layer motor in addition with combined axial- and radial-flux motor can effectively increase torque generation area over rotor's surface. With approximately constant shear stress generation in air gaps, increasing the torque generation area without increasing the motor's volume can effectively improve the motor's torque density. The out-runner motor configuration includes its stator inside and rotor is configured outside of the stator. Comparing with an in-runner motor (where stator at the outside and rotor at the inside), such out-runner motor configuration is beneficial to increase diameter of the radial-flux motor's air gap without changing dimension of the motor, and thus improve the torque generation capability of the motor.

Further, according to an embodiment, the motor includes the toroid windings. The toroid windings are defined as windings wrapped around a ring-shaped steel yoke of the stator. Such windings form a toroid-shaped stator assembly. Some embodiments are based on recognition that use of the toroidal windings reduces length of end turns, which in turn reduces the motor's copper loss and, thereby, improving efficiency of the motor.

In some embodiments, the motor uses the Vernier permanent magnet motor principle which is based on a combination of both fundamental harmonic field and stator teeth harmonic field for the torque generation. This combination can be regarded as a combination of a permanent magnet motor and a magnetic gear, and such combination can increase the motor's torque density. In addition, the vernier PM motor can also provide smoother torque generation. In another embodiment, the Halbach array is utilized for the motor configuration. The Halbach array is an arrangement of the permanent magnets that augments magnetic field on one side of the array while canceling the magnetic field to near zero on the other side. Some embodiments are based on a realization that the magnetic field augmentation is achieved by arranging horizontally-magnetized magnets in between alternating polarity. Comparing with an alternative polarity magnet array, the Halbach array can reduce magnitude of high-order magnetic field harmonics, and thus aids for smooth operation of the motor. In addition, the Halbach array does not require a thick secondary back iron as the permanent magnet arrays, which reduces inertia of the rotor.

Some embodiments aim to achieve a synergy in the torque density improvement by using the afore described features for the motor configuration, while achieving the mechanical stability, the compactness and the thermal management. To that end, some embodiments use stationary shaft and stator attached to the shaft in order to achieve the mechanical stability. To enable this attachment, magnets on inner surface of the rotor closet and parallel to the shaft are removed. Further, in some embodiments, the rotor is placed on an outside of the motor and supported by bearings attached to the shaft, to achieve the compactness. Furthermore, to achieve the thermal management, the windings of the stator are assembled such that the stator windings are in contact with the shaft. In an alternate embodiment, the contact between the stator windings and the shaft is achieved by removing inner magnets, and such a contact allows configuring cooling channels through the shaft. The cooling channels allows a cooling liquid to pass through it. As a result, the cooling liquid absorbs heat generated in the stator windings. Thereby, effectively dissipating the heat generated in the stator windings.

Accordingly, one embodiment discloses a motor, comprising a shaft, an array of stator assemblies rigidly attached to the shaft, each stator assembly includes a stator yoke having a toroid shape fixed around the shaft and having a number of slots at radial and axis directional faces with windings within the slots of the stator yoke; and a rotor assembly rotatively attached to the shaft to enclose the array of stator assemblies, the rotor assembly has a rotor drum with sections, each section embraces one stator assembly, each section has two axial-flux permanent magnet arrays attached on axial-directional inner surfaces of the section and has one radial-flux permanent magnet array attached on a radial-directional inner surface of the section furthest from the shaft, wherein the axial-flux and the radial-flux permanent magnet arrays with the number of pole pairs equals the number of the stator slots plus or minus number of stator winding pole pair.

Additionally, in an embodiment, the motor is provided with a digital controller and an inverter. The digital controller is configured to generate control signals specifying values of one or combination of a multi-phase voltage and a current of the motor for tracking a reference trajectory of torques of the motor. The inverter is configured to supply the multi-phase voltage and the current generated according to the control signals to multi-phase windings of the motor to reduce an error between the reference trajectory and measured torque of the motor.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Motor Configuration

Figure 1:
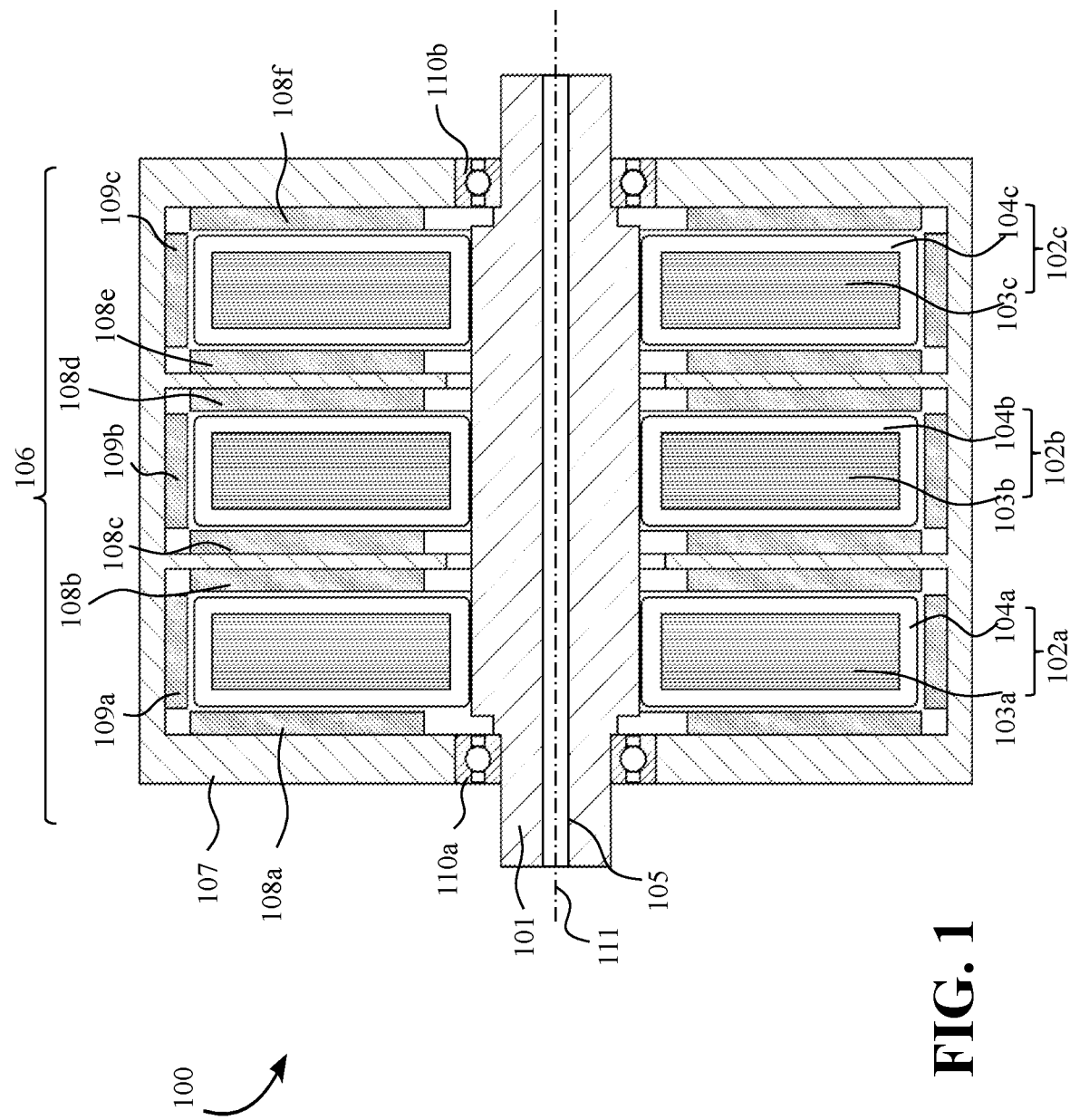
FIG. 1 shows a cross-section view of a motor in accordance with an embodiment of the present disclosure.

FIG. 1 shows a cross-section view of a motor 100 in accordance with an embodiment of the present disclosure. The motor 100 includes an array of stator assemblies. Number of the stator assemblies may vary according to requirements of application of the motor 100 or requirements of the motor 100. The motor 100, in FIG. 1, consists of three identical motor stator assemblies 102a, 102b, and 102c, fixed on a shaft 101. The three identical motor stator assemblies 102a, 102b, and 102c may be combinedly referred to as stator 102. In an embodiment, a press fitting method is used for fixing the stator on the shaft 101. In some embodiments, key or spline method is used to fix the stator on the shaft 101. Additional features on the shaft are applied to fix stator yoke's axial position, such as retaining rings or e-clips. Each stator assembly comprises a stator yoke made of highly permeable electric steel, and a set of stator winding. For instance, the stator assembly 102a comprises a stator yoke 103a made of highly permeable electric steel, and a set of stator winding 104a. Likewise, the stator assembly 102b comprises a stator yoke 103b and a set of stator winding 104b, and the stator assembly 102c comprises a stator yoke 103c and a set of stator winding 104c. The stator yokes 103a, 103b, and 103c may be combinedly referred to as a stator yoke 103. Similarly, the stator windings 104a, 104b, and 104c may be combinedly referred to as stator winding 104. The stator windings (104a, 104b, and 104c) consist of multiple coils wrapping around the stator yoke, forming a toroidal shape. Each coil is formed by multi-turn magnetic wires and mechanically fixed via epoxy inside slots of the stator yoke. The stator windings and the stator yoke are electrically insulated from each other.

The shaft 101 of the motor 100 is a stationary motor shaft. One or multiple cooling channels 105 may be configured inside the shaft 101. A cooling liquid flows through the cooling channels 105. When the motor 100 is assembled, the stator windings (104a, 104b and 104c) are thermally in contact with the shaft 101 where the cooling channels 105 are configured inside. The stator windings (104a, 104b, and 104c) are electrically insulated from the shaft 101. As a result, the cooling liquid absorbs heat generated in the stator windings. Thereby, effectively dissipating the heat generated in the stator windings.

Further, the motor 100 includes a rotor assembly 106 comprising a rotor drum 107 and multiple permanent magnet arrays. Two types of the permanent magnet arrays, namely, axial-flux permanent magnet arrays 108a-108f, and radial-flux permanent magnet array 109a-109c are used in the motor 100. Each permanent magnet (PM) array is engaged with a stator assembly and forms a torque generating air gap. Bearings 110a and 110b are arranged on the shaft 101 and supporting the rotor assembly 300. When the motor 100 is operating, outer races of the bearings 110a and 110b are fixed with respect to the rotor and rotate about an axis 111, while inner faces of the bearings 110a and 110b are fixed on the shaft 101. As a result, mechanical contact between moving part and stationary part only occurs inside the bearings 110a and 110b.

Figure 2:
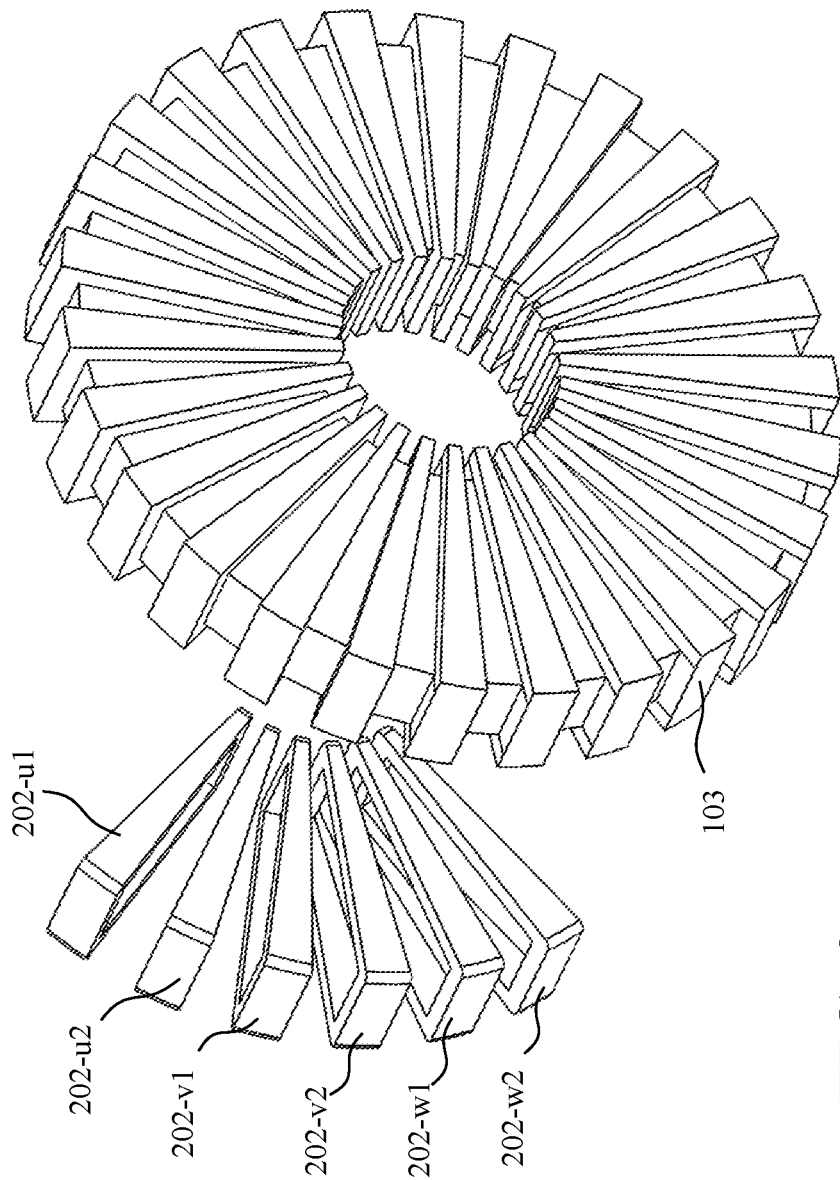
FIG. 2 shows a perspective view of a stator of the motor in accordance with an embodiment of the present disclosure.

FIG. 2 shows a perspective view of the stator 102 of the motor 100 in accordance with an embodiment of the present disclosure. The stator 200 includes the stator yoke 103 made of wound electric steel laminations or soft magnetic composite, which has high magnetic permeability and low conductivity comparing to solid steel materials. The stator yoke 103 forms a ring-shaped core with slots on outer and inner-diameter surfaces and two axial-directional surfaces. Number of the slots is represented by $Z_s$. The stator windings (104a, 104b and 104c) are configured in the slots of the stator yoke 103, and are wrapping around the stator yoke 103 forming the toroid. The stator windings are made from multi-turn magnetic wires and are connected into multiple phases. For instance, the stator 102 has a three-phase winding, including u, v, and w phases, and the stator winding has pole-pair number p. In FIG. 2, 202-u1 and 202-u2 represents 'u' phase winding, 202-v1 and 202-v2 represents 'v' phase winding, and 202-w1 and 202-w2 represents 'w' phase winding.

Figure 3A:
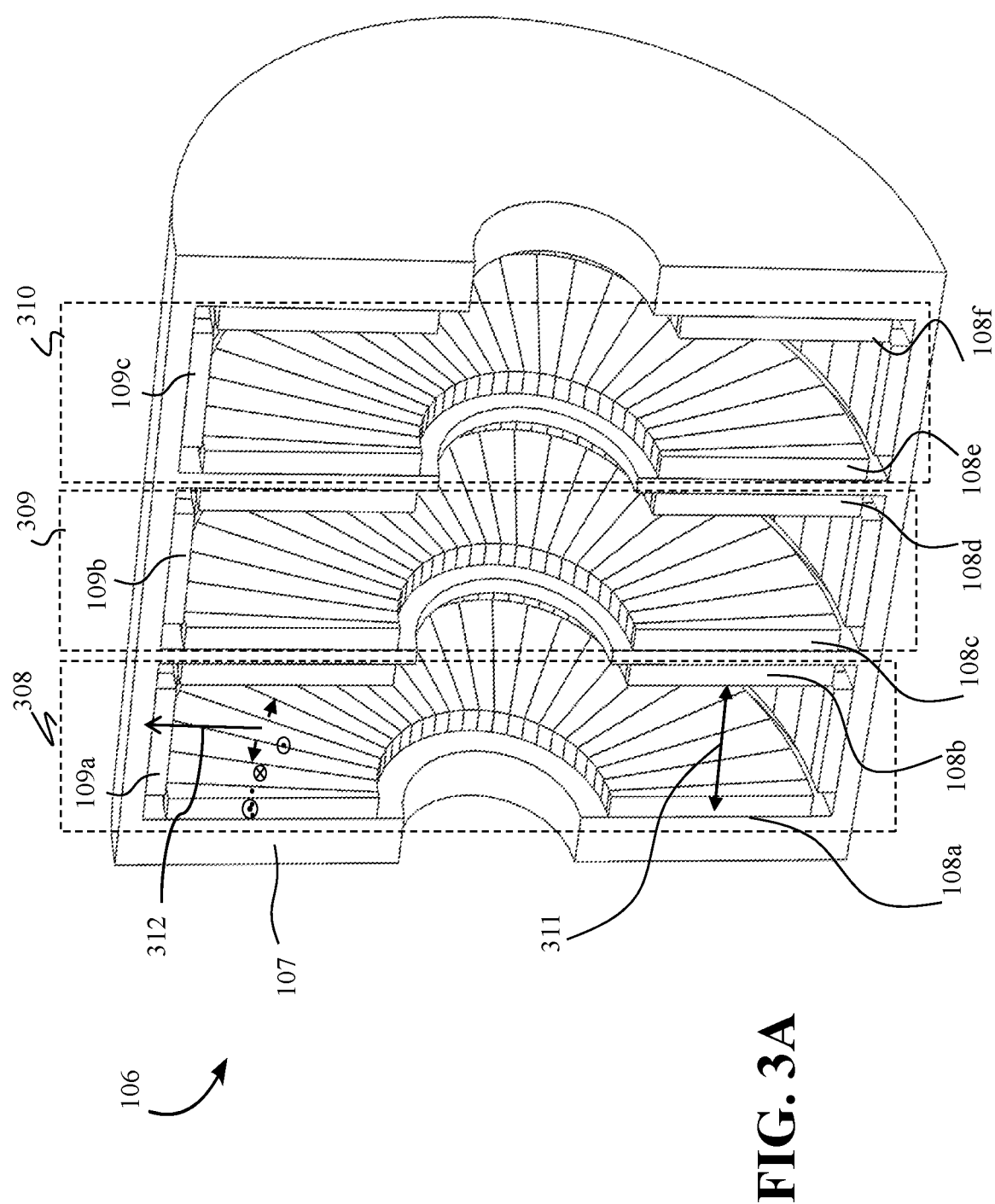
FIG. 3A shows a cross-section view of a rotor assembly of the motor in accordance with an embodiment of the present disclosure.
Figure 3B:
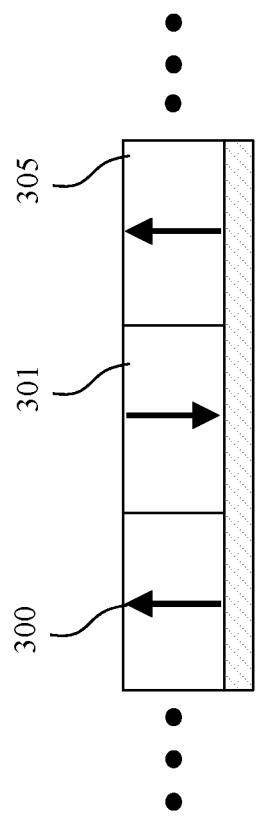
FIG. 3B shows magnetization direction of a two magnet array configuration, according to an embodiment.
Figure 3B:
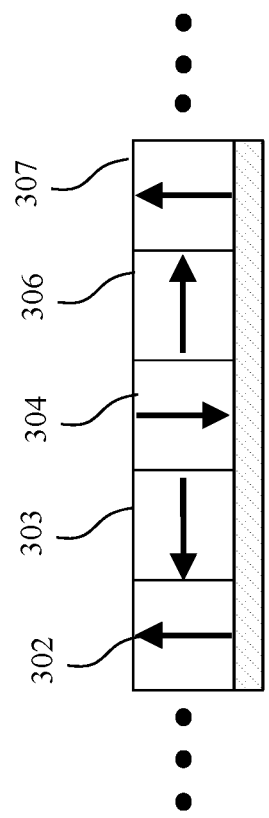

FIG. 3A shows a cross-section view of the rotor assembly 106 of the motor 100 in accordance with an embodiment of the present disclosure. The rotor assembly 106 includes the rotor drum 107 made of highly-permeable steel material. According to an embodiment, the rotor drum 107 can be manufactured as an assembly of multiple steel parts. The rotor assembly 106 is rotatively attached to the shaft 101 using the bearings 110a and 110b. The rotor assembly 106 includes the rotor drum 107 with multiple sections. Number of the sections may vary. The rotor assembly 106 shown in FIG. 3A comprises three sections 308, 309 and 310. Each section embraces one stator assembly. Multiple PM arrays, i.e., the axial-flux permanent magnet arrays 108a-108f, and the radial-flux permanent magnet array 109a-109c are assembled on inner surfaces of the rotor drum 107 with the epoxy. In particular, two axial-flux permanent magnet arrays are attached on axial-directional inner surfaces of each section and one radial-flux permanent magnet array is attached on radial-directional inner surface of each section furthest from the shaft 101. For instance, the section 308 of the rotor drum 107 includes two axial-flux permanent magnet arrays 108a and 108b attached on the axial-directional 311 inner surfaces of the section 308 and one radial-flux permanent magnet array 109a attached on the radial-directional 312 inner surface of the section 308. The radial-flux permanent magnet array 109a is farthest from the shaft 101. In same way, the section 309 of the rotor assembly 106 includes two axial-flux PM arrays 108c and 108d, and one radial-flux PM array 109b. Further, likewise, the section 310 includes two axial-flux PM arrays 108e and 108f, and one radial-flux PM array 109c. Both kinds of PM arrays have magnet pole pair number of $Z_r$. The PM arrays can be configured as alternative polarity magnet arrays or Halbach array. FIG. 3B shows magnetization direction of a two magnet array configuration, according to an embodiment. In the alternative polarity magnet arrays, two magnets 300 and 301 of alternating polarity are placed adjacent to each other. Likewise, adjacent to 301, a magnet 305 of a polarity of alternative or opposite to the polarity of 301 is placed.

Figure 3C:
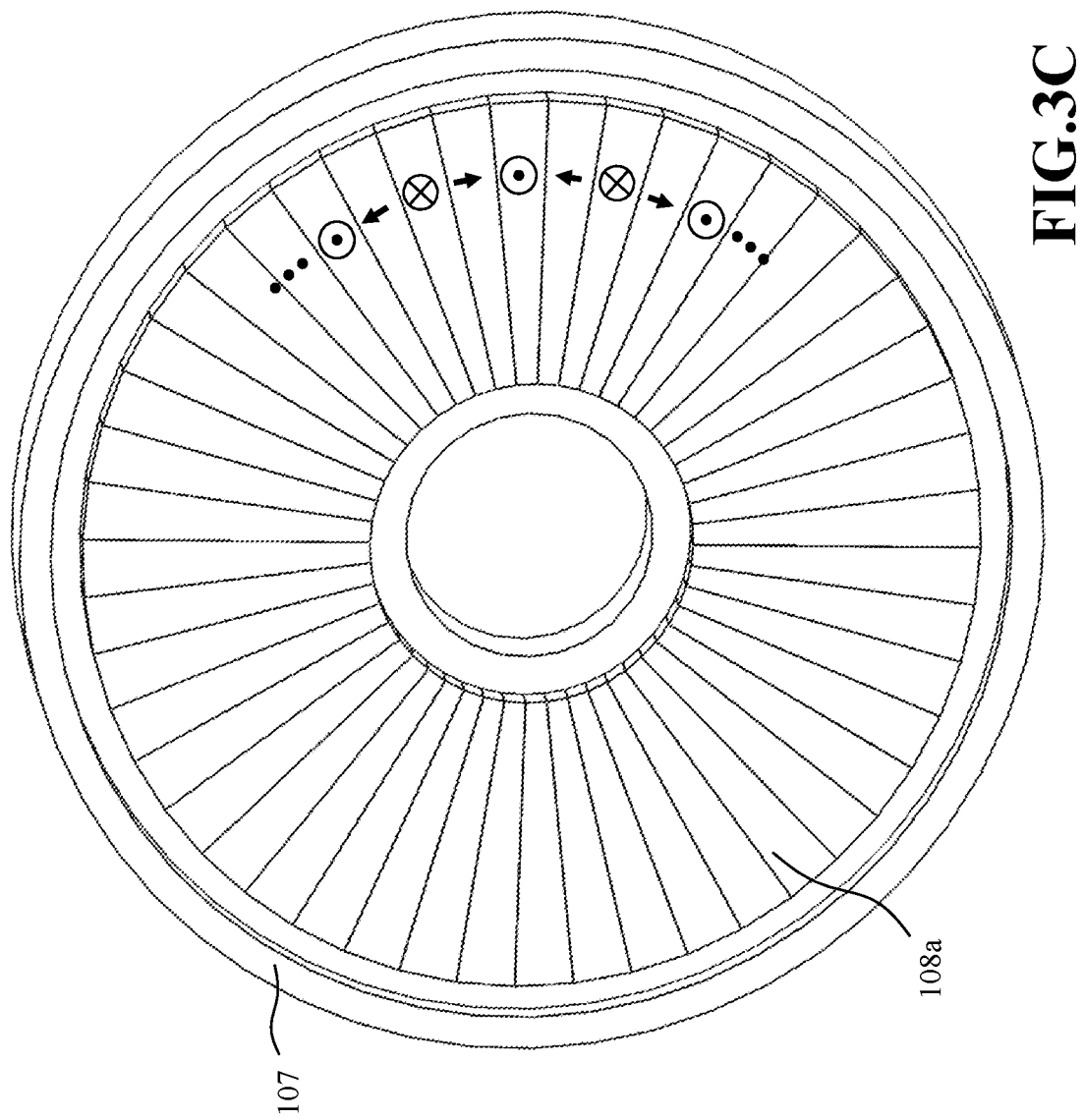
FIG. 3C shows magnetization direction of an axial-flux permanent magnet (PM) array with Halbach array configuration, according to an embodiment.

FIG. 3C shows magnetization direction of the axial-flux PM array with the Halbach array configuration, according to an embodiment. The Halbach array is an arrangement of the permanent magnets that augments the magnetic field on one side of the array while canceling the magnetic field to near zero on the other side. Some embodiments are based on a realization that the magnetic field augmentation is achieved by arranging horizontally-magnetized magnet 303 in between alternating polarities 302 and 304 (shown in FIG. 3B). Likewise, horizontally-magnetized magnet 306 is placed in between alternating polarities 304 and 307. Comparing with the alternative polarity magnet array, the Halbach array can reduce magnitude of high-order magnetic field harmonics, and thus aids for smooth operation of the motor. In addition, the Halbach array does not require a thick secondary back iron as the permanent magnet arrays, which helps reduce inertia of the rotor.

Figure 4:
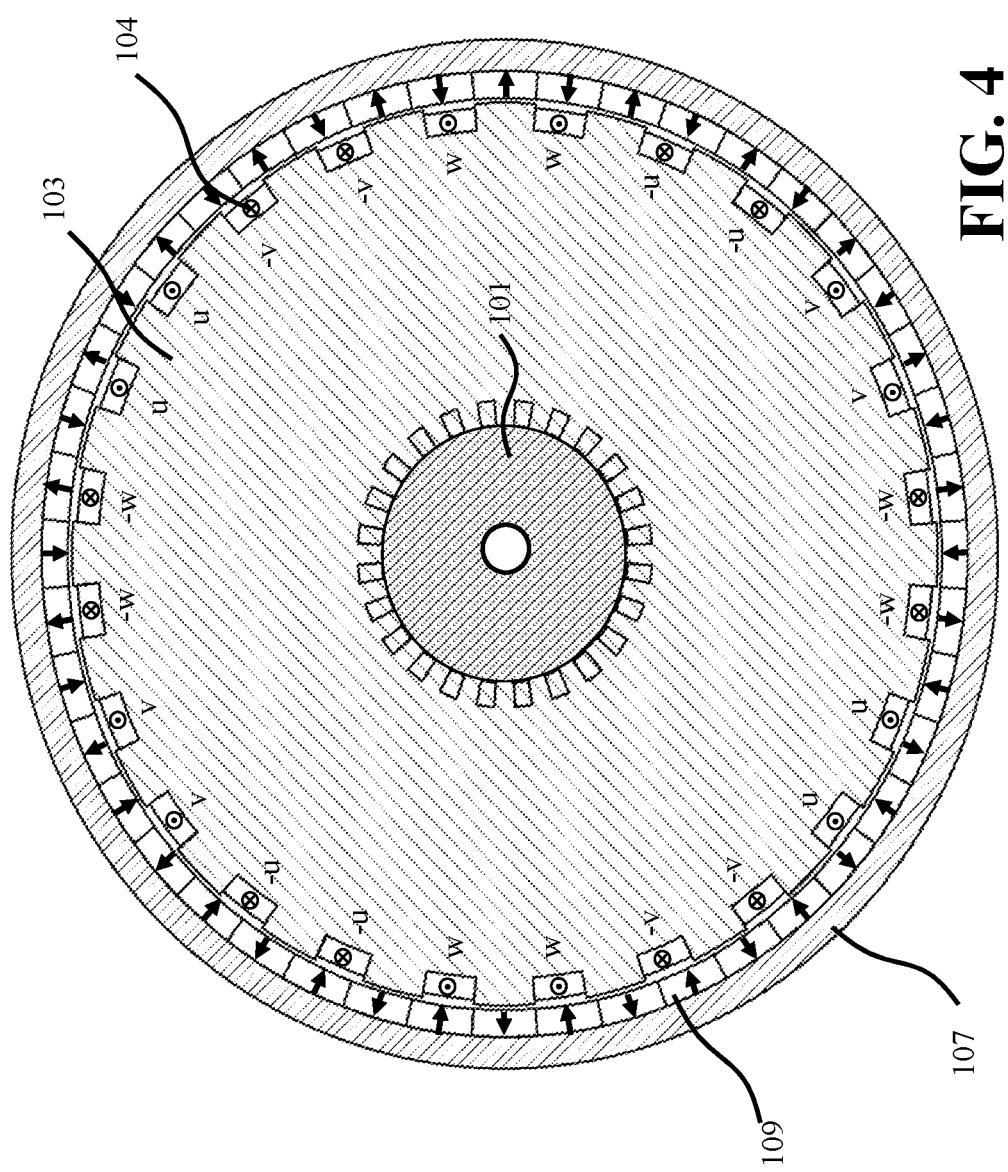
FIG. 4 shows a cross-section view of the motor assembly showing stator windings, according to some embodiments.

FIG. 4 shows a cross-section view of the motor 100 assembly showing the stator winding 104, according to some embodiments. FIG. 4 also shows a cross-section view of the radial-flux permanent magnet array. The stator yoke 103 consists of the slots where the stator winding 104 is placed. For instance, the stator yoke 103 consists of 24 slots, i.e. $Z_s$=24. The stator winding 104 includes the three phases: u, v, and w as labeled in FIG. 4. Here, —u indicates conductors in same phase with u, while its current is in a reversed direction. The pole pair is p=2 for the stator winding. The permanent magnet array has a pole pair number of $Z_r$=22. When exciting the stator windings 104 in the stator assembly 102 with three-phase currents, the motor 100 can generate torque and, thus, rotate the rotor. The motor parameters are related as $$Z_r = Z_s \pm p, \quad (1)$$

The motor 100 forms a vernier PM motor, where both a fundamental harmonic air gap flux and a stator teeth harmonic air gap flux are involved in the torque generation. According to an embodiment, in such vernier PM motors, an electrical speed $\omega_e$ and a motor's mechanical speed $\omega_m$ are related by $$\omega_e = Z_r \omega_m \quad (2)$$

where the permanent magnet pole pair number $Z_r$ is Ac referred as the magnetic gear ratio of the motor.

Figure 5:
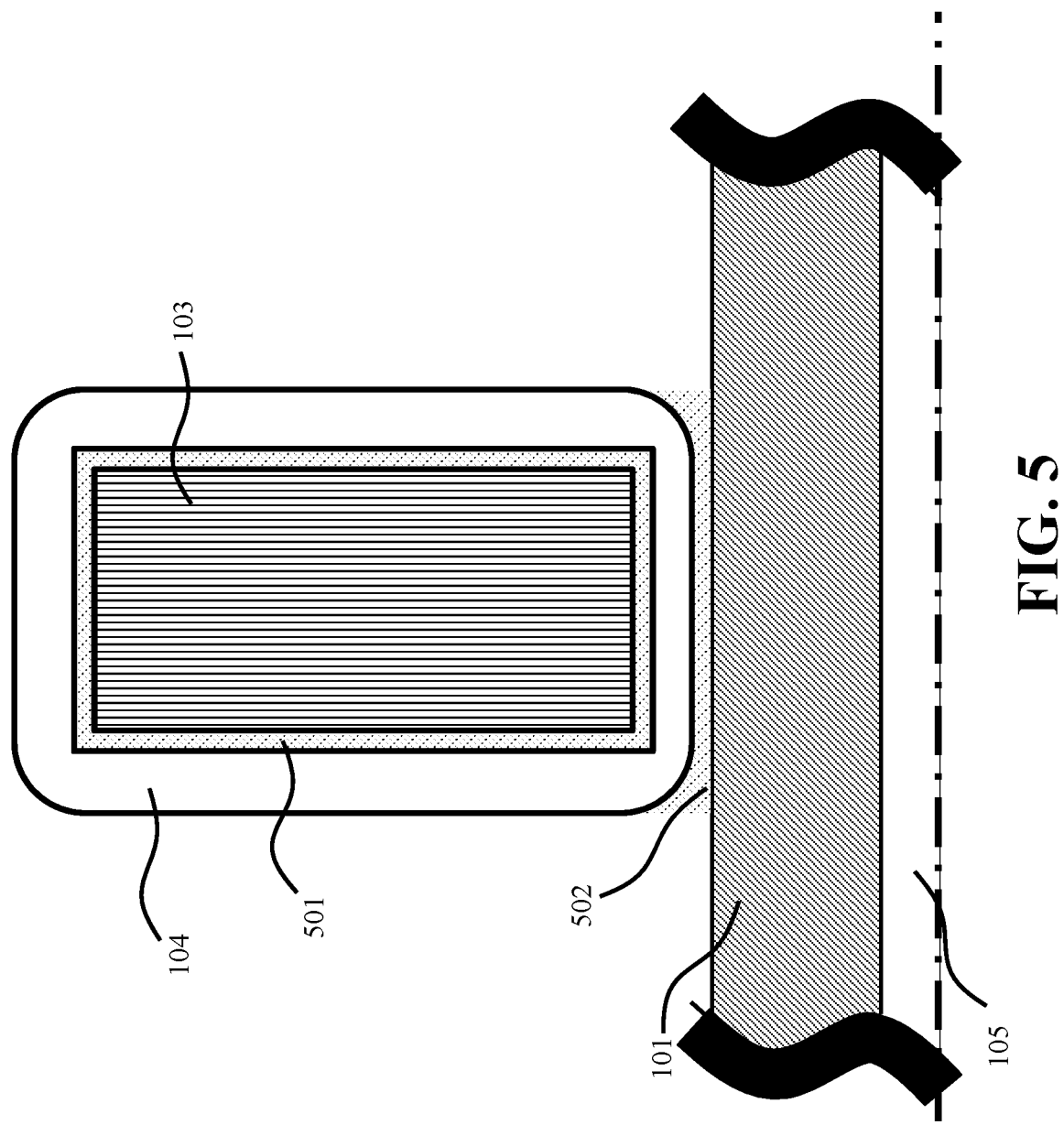
FIG. 5 shows a diagram of a thermal contact and electrical insulation between the stator windings and shaft of the motor, according to some embodiments.

FIG. 5 shows a diagram of the thermal contact and electrical insulation between the stator windings 104 and the shaft 101, according to some embodiments. The stator coils 202 are wound around the stator yoke 103 inside the slots, and a thin layer of electrical insulator 501 is placed in between the stator yoke 103 and the stator windings 103. The insulator 501 can be made of polyimide film or other standard slot insulation material for electric machines. The stator assemblies are well-positioned on the shaft 101 and, subsequently, the stator winding 104 are bonded on the shaft 101 via a thermally conductive yet electrically insulating epoxy 502. The epoxy layer 502 can effectively conduct the heat generated from the stator windings 104 into the shaft, and further into the cooling channels 105. As a result of this, thermal management of the motor 100 is achieved effectively.

Figure 6:
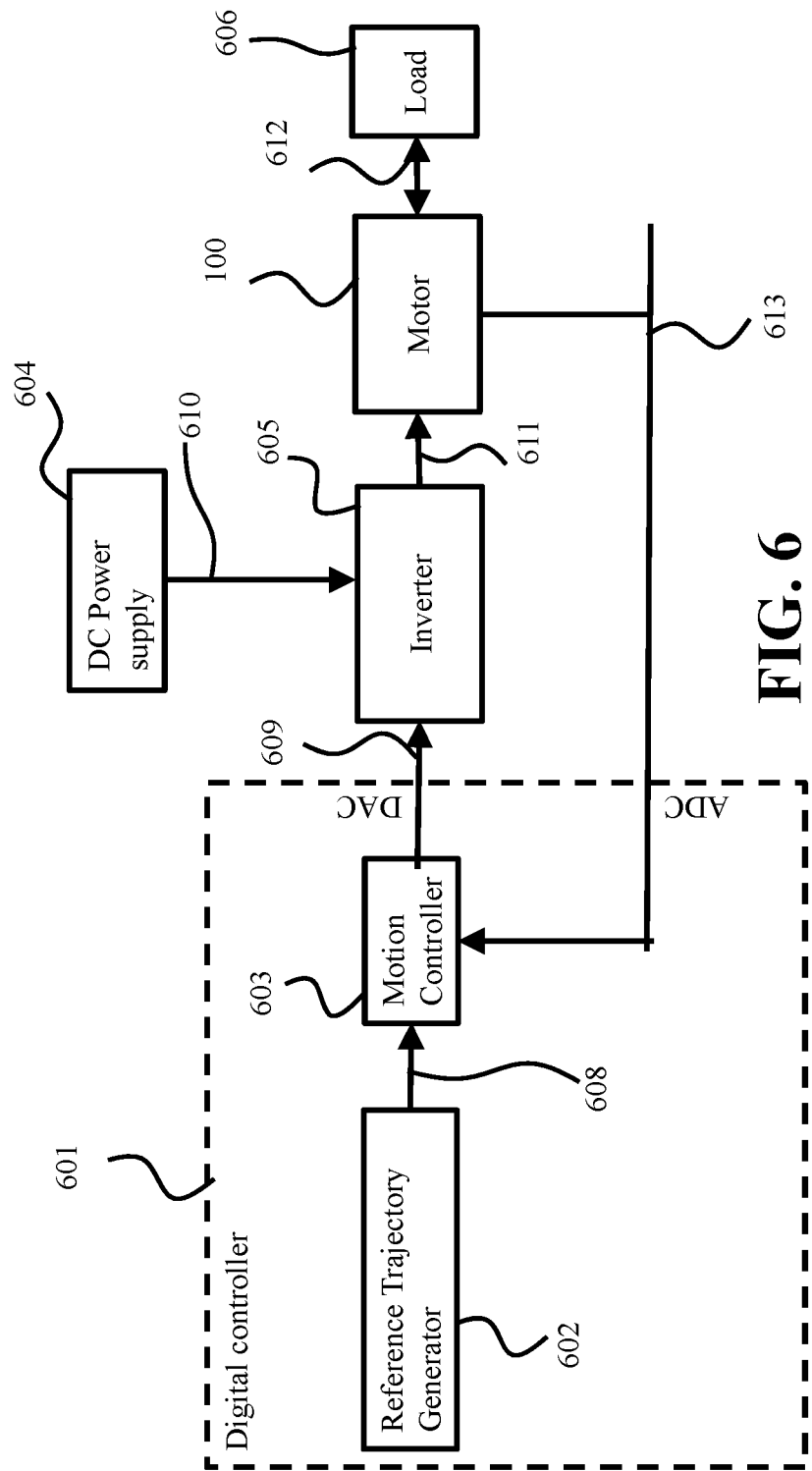
FIG. 6 shows a block diagram of a control system for the motor in accordance with an embodiment of the present disclosure.

FIG. 6 shows a block diagram of a control system for the motor 100 in accordance with an embodiment of the present disclosure. The motor 100 is connected with a load 606 through a connection 612. An angular position of the motor 100 is measured by a position sensor, such as encoder and hall-effect sensor, and the measured angular position signal is feedback 613 into an analog/digital converter of a digital controller 601. Additionally, torque of the motor 100 is also measured. The digital controller 601 is configured to generate control signals 609 specifying values of one or combination of a multi-phase voltage and a current of the motor 100. In particular, the digital controller 601 includes a reference trajectory generator 602 and a motion controller 603. The reference trajectory generator 602 generates a reference trajectory 608 of torques of the motor. Both the motor's measured position 613 and the reference trajectory 608 are fed into a motion controller 603, which generates the control signals 609 in a form of digital PWM signals. The PWM signal 609 controls gates in an inverter 605. A DC power supply 604 generates a high-voltage DC power 610 for the inverter 605. The inverter 605 is configured to supply multi-phase voltage and current 611 according to the control signals to the multi-phase windings of the motor to reduce an error between the reference trajectory 608 and the measured torque of the motor. With such control system, the motor's position can be controlled to follow the reference trajectory.

Operating Principle of the Vernier Permanent Magnet PM Motor

A model of the vernier PM motor is formulated with one or more of assumptions listed below:

Magnetic resistance and saturation of steel parts are neglected.

Relative permeability of magnets is assumed to be 1.

Air gap length is small. The flux density, MMF, and permeance in the air gap vary only in circumference direction, and are uniform in axial and radial direction.

Higher-order harmonics of permanent magnet MMF are neglected.

According to magnetic circuit theory, the permanent magnet can be modeled as a constant MMF in series with a magnet reluctance. The permanent magnet MMF can be expressed as $$\mathcal{F}_{pm}(\theta_s) = \sum_{n=1,3,5,\ldots} \mathcal{F}_{pm_n} \cos(n Z_r \theta_r) \qquad (3)$$
$$= \sum_{n=1,3,5,\ldots} \mathcal{F}_{pm_n} \cos(n Z_r (\theta_s - \theta_m)),$$

where n is a number of harmonics, $\mathcal{F}_{pm_n}$ is amplitude of n-th component of $\mathcal{F}_{pm_n}$, $\theta_s$ and $\theta_r$ are mechanical angle in the stator and rotor frames, respectively. $\theta_m$ is the rotor's angular position. According to an embodiment, $\theta_m = \theta_s - \theta_r = \omega_r t$.

For permanent magnet array with magnet thickness $h_m$, $\mathcal{F}_{pm_n}$ is given as $$\mathcal{F}_{pm_n} = \frac{4}{n\pi} \frac{B_r h_m}{\mu_0}. \qquad (4)$$

For simplification, consider only fundamental harmonic of the rotor MMF as $$\mathcal{F}_{pm}(\theta_s) = \mathcal{F}_{pm_1} \cos(Z_r \theta_s - Z_r \omega_r t), \text{ where} \qquad (5)$$

$$\mathcal{F}_{pm_1} = \frac{4}{\pi} \frac{B_r h_m}{\mu_0}.$$

Further, considering that stator saliency is due to the stator tooth, the air gap permeance can be represented by $$P(\theta_s) = P_0 + \Sigma_{m=0}^{\infty} P_m \cos(m Z_s \theta_s), \qquad (6)$$

where $P_m$ is amplitude of a permeance coefficient of m-th harmonic.

For m=1, i.e. considering only the fundamental harmonics of the air gap permeance, $$P_g(\theta_s) \approx P_0 + P_1 \cos(Z_s \theta_s), \qquad (7)$$

$$P_0 = \frac{\mu_0}{g'}\left(1 - 1.6\beta \frac{b_0}{t}\right), \qquad (8)$$

$$g' = g + h_{mag}, \qquad (9)$$

$$P_1 = \frac{\mu_0}{g'} \frac{4}{\pi} \beta \left( \frac{1}{2} + \frac{(b_0/t)^2}{0.78125 - 2(b_0/t)^2} \right) \sin\left(1.6\pi \frac{b_0}{t}\right), \qquad (10)$$

$$\beta = 0.5 - \frac{1}{2\left(1 + (b_0/2g')^{-\frac{1}{2}}\right)}, \qquad (11)$$

where $b_0$ is slot opening, t is a slot pitch, g is a mechanical air gap length, g' is magnetic air gap length, $h_{mag}$ is a height of the permanent magnet. It is noticed that a ratio $b_0/t$ and $t/g'$ are important parameters.

Further, air gap flux density generated by the permanent magnets can be calculated as $$B_{pm} = \mathcal{F}_{pm}(\theta_s) P_g(\theta_s) \qquad (12)$$
$$\approx \mathcal{F}_{pm_1} \cos(Z_r(\theta_s - \theta_m))(P_0 + P_1 \cos(Z_s \theta_s))$$
$$\approx B_{pm_1} \cos((Z_r \pm Z_s)\theta_s - Z_r \theta_m) + B_{pm_h} \cos(Z_r(\theta_s - \theta_m)),$$

where $$B_{pm_1} = \frac{\mathcal{F}_{pm_1} P_1}{2}, \qquad (13)$$

$$B_{pm_h} = \mathcal{F}_{pm_1} P_0. \qquad (14)$$

For the vernier PM motors $(Z_r - Z_s)$ equals ±p, so first term in (12) has spatial period equals to a fundamental component of coil MMF. In general, $P_0 > P_1$, therefore $B_{pm_1} < B_{pm_h}$, due to which the motor's torque can reduced by using the first term. The second term in (12) has the same spatial period with one stator teeth harmonic MMF, as the order of the slot harmonics is $Z_s/p \pm 1$. Rotational directions of the first and second terms are same if $Z_r = Z_s + p$, and the rotational directions of the first and second terms become opposite to each other when $Z_r = Z_s - p$.

Considering the fundamental and the slot harmonics in stator winding $N_s$ that match with the PM array, both the fundamental and the slot harmonics are given as $$N_s(\theta_s) \approx k_w N \cos(p\theta_s) + k_w N_{h1} \cos((Z_s - p)\theta_s) - k_w N_{h2} \cos((Z_s + p)\theta_s), \qquad (15)$$

where $N_{h1}$ and $N_{h2}$ are magnitude of the teeth harmonics in the stator winding distribution. In general, $N_{h1} = N/(Z_s/p - 1)$, $N_{h2} = N/(Z_s/p + 1)$. Both $N_{h1}$ and $N_{h2}$ are a lot smaller than the fundamental number of turns N.

Flux linkage in one phase windings due to flux of the PM can be given by $$\lambda_s(\theta_s) = lR \int_0^{2\pi} N_s(\theta_s) B_{pm}(\theta_s) d\theta_s \qquad (16)$$

$$= lR \int_0^{2\pi} (k_w N \cos(p\theta_s) + k_W N_{h1} \cos((Z_s - p)\theta_s)$$

$$k_w N_{h2} \cos((Z_s + p)\theta_s)) \times$$

$$(B_{pm_1} \cos(p\theta_s - Z_r\theta_m) + B_{pm_h} \cos(Z_r(\theta_s - \theta_m))) d\theta_s.$$

Assuming $Z_r = Z_s - p$, the second term in the PM flux includes a matching harmonic number with the second term in the stator winding distribution. As a result, $$\lambda_s(\theta_s) = \pi R l k_w (N B_{pm_1} + N_{h1} B_{pm_h}) \cos(Z_r \theta_m). \qquad (17)$$

Similarly, with sinusoidal currents in the windings, the motor torque is given as $$T_e = \frac{3\pi}{2} Z_r R l k_w (N B_{pm_1} + N_{h1} B_{pm_h}) I_s. \qquad (18)$$

In an embodiment, an assumption $$N_{h1} = N/(Z_s/p - 1) = \frac{N}{Z_r/p}$$

is considered, which results $$T_e = \frac{3\pi}{2} Z_r R l k_w N \left( B_{pm_1} + \frac{B_{pm_h}}{Z_r/p} \right). \qquad (19)$$

The stator slot harmonic yields a positive contribution to $T_e$. If $Z_r$ is selected such that $Z_r = Z_s + p$, then two terms in $T_e$ are subtracting and, thereby, decreasing the torque. Likewise, selecting $Z_r = Z_s - p$ results in a larger torque generation compared to the torque when $Z_r = Z_s + p$. Also, according to an embodiment, supply speed $\omega_e$ and motor mechanical speed $\omega_r$ are related by $\omega_e = Z_r \omega_r$. The rotor pole pair $Z_r$ can be regarded as a gear ratio of the vernier PM motor.

Estimated Torque Improvement

The motor 100 of following dimensions is considered.
Number of motor layers $N_{layer} = 3$,
axial-flux PM array inner radius $r_i = 60$ mm,
axial-flux PM array outer radius/radial-flux motor air gap radius $r_o = 120$ mm,
stack length of each radial-flux motor $t = 30$ mm, and
shear flux of surface mount permanent magnet machine $\tau = 10$ kPa Initially it is assumed there is no vernier effect. With the given dimensions, the torque of one axial-flux motor and one radial-flux motor are $$T_{axial} \approx \tau \int_{r_i}^{r_o} 2\pi r^2 \tau dr = 32 \text{ Nm}, \qquad (20)$$

$$T_{radial} \approx \tau r_o^2 \times 2\pi t = 27 \text{ Nm}. \qquad (21)$$

With three layers, total torque of the motor is $$T_{total} = 6 T_{axial} + 3 T_{radial} \approx 273 \text{ Nm}. \qquad (22)$$

Now consider the vernier effect. According to some embodiments, expected torque improvement from the vernier effect compared with regular surface PM motor is about 30%. Then, the estimated torque of the motor 100

$$T_{invented} \approx 1.3 \times 273 = 354 \text{ Nm}. \qquad (23)$$

Further, the torque capability of a regular surface PM motor with same size is calculated. The regular motor's torque can be estimated as $$T_{baseline} \approx r_o^2 \times 2\pi (3 \times 2 \times t) \tau = 167 \text{ Nm}. \qquad (24)$$

Comparing with the baseline motor, invented motor or the motor 100 of the present disclosure yields 2.1 times torque improvement.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A motor, comprising:
   a shaft;
   an array of stator assemblies rigidly attached to the shaft, wherein the array of stator assemblies includes multiple stator assemblies, each stator assembly includes a stator yoke having a toroid shape fixed around the shaft and having a number of slots at radial and axis directional faces with windings of a stator assembly within the slots of the stator yoke; and
   a rotor assembly rotatively attached to the shaft to enclose the array of stator assemblies, the rotor assembly has a rotor drum with sections, a section embraces one stator assembly with walls thinner than walls of the rotor drum thereby placing the stator assemblies in the array of stator assemblies in proximity of each other, each section has two axial-flux permanent magnet arrays attached on axial-directional inner surfaces of the section and has one radial-flux permanent magnet array attached on a radial-directional inner surface of the section furthest from the shaft, wherein each of the axial-flux permanent magnet arrays and the radial-flux permanent magnet array has the number of pole pairs equals the number of the stator slots plus or minus a number of pole pairs for the windings of the stator assembly, wherein one or a combination of the axial-flux and the radial-flux permanent magnet arrays of the stator assemblies in different sections have a Halbach structure.

2. The motor of claim 1, wherein the axial-flux and the radial-flux permanent magnet arrays have alternative polarity.

3. The motor of claim 1, wherein the rotor assembly is rotatively attached to the shaft using bearings.

4. The motor of claim 1, wherein the windings are thermally connected to the shaft.

5. The motor of claim 4, wherein the shaft includes at least on cooling channel.

6. The motor of claim 4, wherein the thermal connection of the windings and the shaft is implemented using a thermally conductive while electrically insulating epoxy.

7. The motor of claim 1, wherein the windings of the slot include multi-phase windings.

8. A system including the motor of claim 1, further comprising:
   a digital controller configured to generate control signals specifying values of one or a combination of multi-phase voltages and multi-phase currents of the motor for tracking a reference trajectory of torques of the motor; and
   an inverter configured to supply the multi-phase voltages and currents generated according to the control signals to multi-phase windings of the motor to reduce an error between the reference trajectory and measured torque of the motor.

9. The system of claim 8, further comprising a load positioned by the motor.

* * * * *